(12) United States Patent
Wang et al.

(10) Patent No.: US 10,825,459 B2
(45) Date of Patent: Nov. 3, 2020

(54) METHOD AND APPARATUS FOR CONVERTING VOICE INTO TEXT IN MULTIPARTY CALL

(71) Applicant: Huawei Technologies Co., Ltd., Shenzhen (CN)

(72) Inventors: Xiyong Wang, Shenzhen (CN); Hongrui Jiang, Shenzhen (CN); Weijun Zheng, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 140 days.

(21) Appl. No.: 15/547,465

(22) PCT Filed: Jan. 30, 2015

(86) PCT No.: PCT/CN2015/071966
§ 371 (c)(1),
(2) Date: Jul. 28, 2017

(87) PCT Pub. No.: WO2016/119226
PCT Pub. Date: Aug. 4, 2016

(65) Prior Publication Data
US 2017/0372701 A1    Dec. 28, 2017

(51) Int. Cl.
*G10L 15/26* (2006.01)
*H04M 3/56* (2006.01)
(Continued)

(52) U.S. Cl.
CPC .......... *G10L 15/265* (2013.01); *H04L 67/146* (2013.01); *H04M 1/64* (2013.01);
(Continued)

(58) Field of Classification Search
None
See application file for complete search history.

(56) References Cited

U.S. PATENT DOCUMENTS 7,236,580 B1 * 6/2007 Sarkar ............... H04M 3/42221
379/202.01
2002/0133342 A1   9/2002 McKenna
(Continued)

FOREIGN PATENT DOCUMENTS

CN           1636384 A     7/2005
CN           1859331 A    11/2006
(Continued)

*Primary Examiner* — Alpus Hsu
*Assistant Examiner* — Camquyen Thai
(74) *Attorney, Agent, or Firm* — Slater Matsil, LLP

(57) ABSTRACT

A method and an apparatus for converting a speech-to-text in a multiparty call. Receiving speech-to-text requests sent by at least two terminals, where the speech-to-text requests include a first identifier and a second identifier; allocating a session to the at least two terminals, so that in the speech-to-text requests sent by the at least two terminals, terminals that have a same first identifier or a same second identifier have a same session; receiving, by using a packet-switched domain, a voice stream whose sampling rate is greater than 8 KHz and that is sent by at least one terminal in one multiparty call, where the multiparty call corresponds to one session; converting the voice stream into a text; and sending the text to a terminal in the multiparty call.

18 Claims, 8 Drawing Sheets

(51) Int. Cl.
  *H04M 1/64* (2006.01)
  *H04L 29/08* (2006.01)
(52) U.S. Cl.
  CPC .......... *H04M 3/56* (2013.01); *H04M 2201/40* (2013.01); *H04M 2201/60* (2013.01)

(56) References Cited

U.S. PATENT DOCUMENTS

| | | |
|---|---|---|
| 2003/0114109 A1 | 6/2003 | Thayer et al. |
| 2005/0201540 A1 | 9/2005 | Rampey et al. |
| 2005/0232166 A1* | 10/2005 | Nierhaus ............. H04L 12/1813 370/260 |
| 2006/0282265 A1* | 12/2006 | Grobman ................ G10L 15/22 704/246 |
| 2008/0069011 A1 | 3/2008 | Sekaran et al. |
| 2010/0080375 A1* | 4/2010 | Michaelis ........... H04L 12/1822 379/202.01 |
| 2010/0202599 A1* | 8/2010 | Hillis .................... H04M 7/122 379/93.21 |
| 2011/0195739 A1 | 8/2011 | Deleus et al. |
| 2012/0140908 A1* | 6/2012 | Sana ................... H04M 7/0057 379/93.01 |
| 2012/0150968 A1* | 6/2012 | Yasrebi ................... H04L 51/24 709/206 |
| 2012/0231821 A1* | 9/2012 | Swanson ............... H04W 4/046 455/466 |
| 2013/0294595 A1 | 11/2013 | Michaud et al. |
| 2013/0339025 A1* | 12/2013 | Suhami ................. H04R 25/00 704/271 |
| 2014/0050308 A1 | 2/2014 | Blecon et al. |
| 2015/0046581 A1* | 2/2015 | Inoue .................... H04L 65/403 709/224 |
| 2015/0154183 A1* | 6/2015 | Kristjansson ......... G06F 17/289 704/3 |
| 2015/0162003 A1* | 6/2015 | Zhai ...................... H04L 51/066 704/235 |

FOREIGN PATENT DOCUMENTS

| | | |
|---|---|---|
| CN | 101068271 A | 11/2007 |
| EP | 2627063 A1 | 8/2013 |
| JP | 2005012484 A | 1/2005 |
| JP | 2005513542 A | 5/2005 |
| JP | 2013198066 A | 9/2013 |
| KR | 20090052869 A | 5/2009 |
| RU | 2012136154 A | 3/2014 |
| WO | 2008066836 A1 | 6/2008 |

* cited by examiner

METHOD AND APPARATUS FOR CONVERTING VOICE INTO TEXT IN MULTIPARTY CALL

CROSS-REFERENCE TO RELATED APPLICATIONS

This application is a national stage of International Application No. PCT/CN2015/071966, filed on Jan. 30, 2015, which is hereby incorporated by reference in its entirety.

TECHNICAL FIELD

The present invention relates to the field of communications technologies, and in particular, to a method and an apparatus for converting a voice into a text in a multiparty call.

BACKGROUND

With continuous development of communications technologies, a telephone is indispensable in daily life, and the telephone has more functions. Because making a call is quick and convenient, many important business negotiations, work arrangements, meetings, and the like are performed by making a call. To ensure reliability of performing the foregoing work by making a call, a call record (that is, a call text) needs to be obtained after a voice conversation is finished.

Currently, a main manner of obtaining the call text is as follows: first performing manual recording, and then listening to the recording manually and compiling the recording into a text, and accuracy of a call text obtained in this way is relatively high but this manner is time and labor-consuming. Alternatively, in a call process, sampling a voice stream of the call, and sending the voice stream obtained by sampling to a speech recognition engine. The speech recognition engine converts voice information into text information and sends the converted text to a terminal used by a user. The process requires no manual operation, and saves human labor and time. However, because a voice information sampling rate obtained by using a circuit-switched domain is 8 KHz, an effect of speech recognition by the speech recognition engine is poor, and accuracy of a text converted by the speech recognition engine is low.

In conclusion, currently there is no method for accurately obtaining a text converted from a voice in a multiparty call in a time-saving and effortless way.

SUMMARY

Embodiments of the present invention provide a method and an apparatus for converting a voice into a text in a multiparty call. This can accurately obtain the text converted from the voice in the multiparty call in a time-saving and effortless way.

To achieve the foregoing objective, the following technical solutions are adopted in the embodiments of the present invention:

According to a first aspect, a method for converting a voice into a text in a multiparty call is provided, where the method is applied to a server and includes: receiving converted-to-text requests that are sent by at least two terminals, where the converted-to-text requests include a first identifier and a second identifier; allocating a session to the at least two terminals, so that in the converted-to-text requests sent by the at least two terminals, terminals that have a same first identifier or a same second identifier have a same session; receiving, by using a packet-switched domain, a voice stream whose sampling rate is greater than 8 KHz and that is sent by at least one terminal in one multiparty call, where the multiparty call corresponds to one session; converting the voice stream into a text; and sending the text to a terminal in the multiparty call.

With reference to the first aspect, in a first possible implementation manner of the first aspect, the allocating a session to the at least two terminals includes: if a database includes a first identifier or a second identifier in a converted-to-text request sent by a first terminal, allocating, to the first terminal, a session that is in the database and corresponding to the first identifier or the second identifier in the converted-to-text request sent by the first terminal, where the first terminal is any terminal of the at least two terminals, and the database includes at least one session and a terminal identifier corresponding to the at least one session; and if the database does not include a first identifier and a second identifier in a converted-to-text request sent by a second terminal, the first identifier in the converted-to-text request sent by the second terminal is the same as a first identifier in a converted-to-text request sent by a third terminal, and the second identifier in the converted-to-text request sent by the second terminal is the same as a second identifier in the converted-to-text request sent by the third terminal, allocating a same new session to the second terminal and the third terminal.

With reference to the first aspect or the first possible implementation manner of the first aspect, in a second possible implementation manner of the first aspect, the text includes an identifier of the at least one terminal, or the text includes an identifier and a user name that are of the at least one terminal.

With reference to the first aspect or the first possible implementation manner of the first aspect or the second possible implementation manner of the first aspect, in a third possible implementation manner of the first aspect, after the allocating a session to the at least two terminals, the method further includes: if the allocated session is a new session, establishing a correspondence between the allocated session and identifiers of the at least two terminals, and adding the correspondence to the database; or if the allocated session is a session in the database, adding, to the database, an identifier that is in the identifiers of the at least two terminals and that is of a terminal not included in the database, so that the added identifier corresponds to the allocated session.

With reference to any one of the first aspect, or the first to the third possible implementation manners of the first aspect, in a fourth possible implementation manner of the first aspect, after the receiving, by using a packet-switched domain, a voice stream whose sampling rate is greater than 8 KHz and that is sent by at least one terminal in one multiparty call, the method further includes: receiving an end message sent by a fifth terminal; removing an identifier of the fifth terminal from the database; and if an identifier of a terminal corresponding to a session is empty in the database, removing the session from the database.

According to a second aspect, an apparatus for converting a voice into a text in a multiparty call is provided, where the apparatus includes: a first receiving unit, configured to receive converted-to-text requests that are sent by at least two terminals, where the converted-to-text requests include a first identifier and a second identifier; an allocation unit, configured to allocate a session to the at least two terminals, so that in the converted-to-text requests sent by the at least two terminals, terminals that have a same first identifier or a same second identifier have a same session; a second receiving unit, configured to receive, by using a packet-switched domain, a voice stream whose sampling rate is greater than 8 KHz and that is sent by at least one terminal in one multiparty call, where the multiparty call corresponds to one session; a conversion unit, configured to convert the voice stream into a text; and a sending unit, configured to send the text to a terminal in the multiparty call.

With reference to the second aspect, in a first possible implementation manner of the second aspect, the allocation unit is configured to: if a database includes a first identifier or a second identifier in a converted-to-text request sent by a first terminal, allocate, to the first terminal, a session that is in the database and corresponding to the first identifier or the second identifier in the converted-to-text request sent by the first terminal, where the first terminal is any terminal of the at least two terminals, and the database includes at least one session and a terminal identifier corresponding to the at least one session; and if the database does not include a first identifier and a second identifier in a converted-to-text request sent by a second terminal, the first identifier in the converted-to-text request sent by the second terminal is the same as a first identifier in a converted-to-text request sent by a third terminal, and the second identifier in the converted-to-text request sent by the second terminal is the same as a second identifier in the converted-to-text request sent by the third terminal, allocate a same new session to the second terminal and the third terminal.

With reference to the second aspect or the first possible implementation manner of the second aspect, in a second possible implementation manner of the second aspect, the text includes an identifier of the at least one terminal, or the text includes an identifier and a user name that are of the at least one terminal.

With reference to the second aspect or the first possible implementation manner of the second aspect, or the second possible implementation manner of the second aspect, in a third possible implementation manner of the second aspect, the apparatus further includes: an adding unit, configured to: if the allocated session is a new session, establish a correspondence between the allocated session and identifiers of the at least two terminals, and add the correspondence to the database; where the adding unit is further configured to: if the allocated session is a session in the database, add, to the database, an identifier that is in the identifiers of the at least two terminals and that is of a terminal not included in the database, so that the added identifier corresponds to the allocated session.

With reference to any one of the second aspect, or the first to the third possible implementation manners of the second aspect, in a fourth possible implementation manner of the second aspect, the apparatus further includes: a third receiving unit, configured to receive an end message sent by a fifth terminal; and a removal unit, configured to remove an identifier of the fifth terminal from the database; where the removal unit is further configured to: if an identifier of a terminal corresponding to a session is empty in the database, remove the session from the database.

According to a third aspect, an apparatus for converting a voice into a text in a multiparty call is provided, where the apparatus includes a first receiver, configured to receive converted-to-text requests that are sent by at least two terminals, where the converted-to-text requests include a first identifier and a second identifier. A processor is configured to allocate a session to the at least two terminals, so that in the converted-to-text requests sent by the at least two terminals, terminals that have a same first identifier or a same second identifier have a same session. A second receiver is configured to receive, by using a packet-switched domain, a voice stream whose sampling rate is greater than 8 KHz and that is sent by at least one terminal in one multiparty call, where the multiparty call corresponds to one session; where the processor is further configured to convert the voice stream into a text. A transmitter is configured to send the text to a terminal in the multiparty call.

With reference to the third aspect, in a first possible implementation manner of the third aspect, the processor is further configured to: if a database includes a first identifier or a second identifier in a converted-to-text request sent by a first terminal, allocate, to the first terminal, a session that is in the database and corresponding to the first identifier or the second identifier in the converted-to-text request sent by the first terminal, where the first terminal is any terminal of the at least two terminals, and the database includes at least one session and a terminal identifier corresponding to the at least one session; and if the database does not include a first identifier and a second identifier in a converted-to-text request sent by a second terminal, the first identifier in the converted-to-text request sent by the second terminal is the same as a first identifier in a converted-to-text request sent by a third terminal, and the second identifier in the converted-to-text request sent by the second terminal is the same as a second identifier in the converted-to-text request sent by the third terminal, allocate a same new session to the second terminal and the third terminal.

With reference to the third aspect or the first possible implementation manner of the third aspect, in a second possible implementation manner of the third aspect, the text includes an identifier of the at least one terminal, or the text includes an identifier and a user name that are of the at least one terminal.

With reference to the third aspect or the first possible implementation manner of the third aspect or the second possible implementation manner of the third aspect, in a third possible implementation manner of the third aspect, the processor is further configured to: if the allocated session is a new session, establish a correspondence between the allocated session and identifiers of the at least two terminals, and add the correspondence to the database; and the processor is further configured to: if the allocated session is a session in the database, add, to the database, an identifier that is in the identifiers of the at least two terminals and that is of a terminal not included in the database, so that the added identifier corresponds to the allocated session.

With reference to any one of the third aspect, or the first to the third possible implementation manners of the third aspect, in a fourth possible implementation manner of the third aspect, the apparatus further includes: a third receiver, configured to receive an end message sent by a fifth terminal; where the processor is further configured to remove an identifier of the fifth terminal from the database; and the processor is further configured to: if an identifier of a terminal corresponding to a session is empty in the database, remove the session from the database.

According to the method and the apparatus for converting a voice into a text in a multiparty call that are provided in the embodiments of the present invention, converted-to-text requests sent by at least two terminals are received, where the converted-to-text requests include a first identifier and a second identifier; a session is allocated to the at least two terminals, so that in the converted-to-text requests sent by the at least two terminals, terminals that have a same first identifier or a same second identifier are allocated with a same session; a voice stream whose sampling rate is greater than 8 KHz and that is sent by at least one terminal in one multiparty call is received by using a packet-switched domain, where the multiparty call corresponds to one session; the voice stream is converted into a text; and the text is sent to a terminal in the multiparty call. Because a received voice stream is the voice stream whose sampling rate is greater than 8 KHz and that is received by using a packet-switched domain, the packet-switched domain may support transmission of a voice stream of a high sampling rate, and after the received voice stream is converted into a text, accuracy of an obtained text is high. Further, the process requires no manual operation, and is relatively quick and saves human labor and time. In conclusion, it may be learned that by using the method provided in the present invention, accurately obtaining a text converted from a voice in a multiparty call may be implemented in a time-saving and effortless way, which resolves a problem in a prior art that obtaining a text converted from a voice in a multiparty call is either time- and labor-consuming, or inaccurate.

BRIEF DESCRIPTION OF THE DRAWINGS

To describe the technical solutions in the embodiments of the present invention or in the prior art more clearly, the following briefly describes the accompanying drawings required for describing the embodiments or the prior art. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by persons of ordinary skill in the art based on the embodiments of the present invention without creative efforts shall fall within the protection scope of the present invention.

Figure 1:
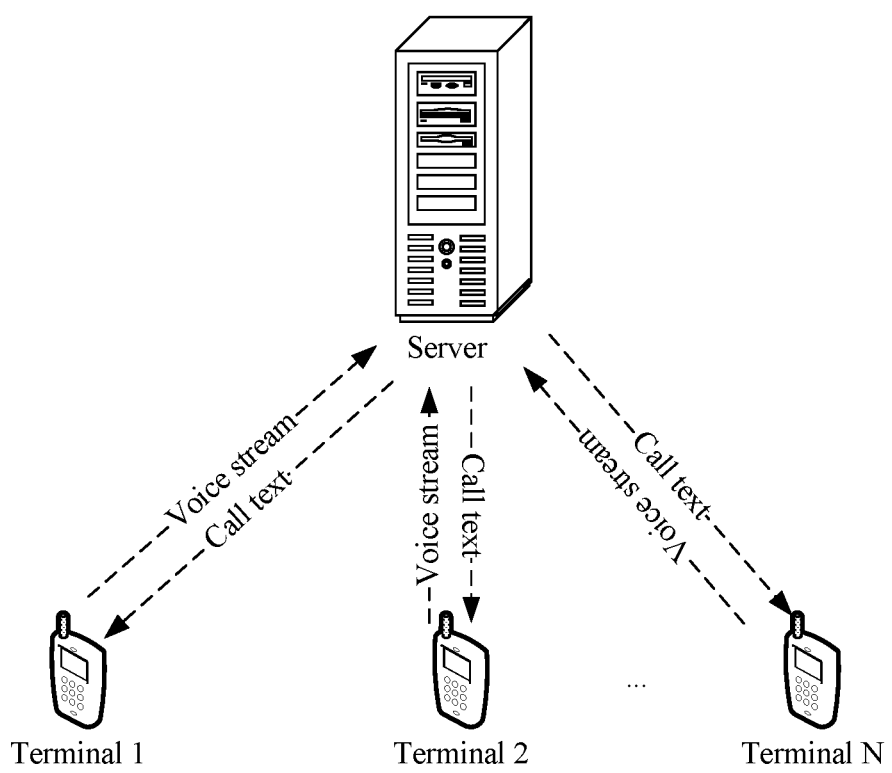
FIG. 1 is a network architecture diagram of converting a voice into a text in a multiparty call according to an embodiment of the present invention.

FIG. 1 shows a network architecture diagram of converting a voice into a text in a multiparty call. A terminal 1 to a terminal N establish a multiparty call, and the terminal 1 to the terminal N all enable a converted-to-text function. In a call process, the terminal 1 to the terminal N send a voice stream to a server by using a packet-switched domain, and the server converts the voice stream into a text, and the server sends the text to the terminal 1 to the terminal N.

Embodiment 1

Figure 2:
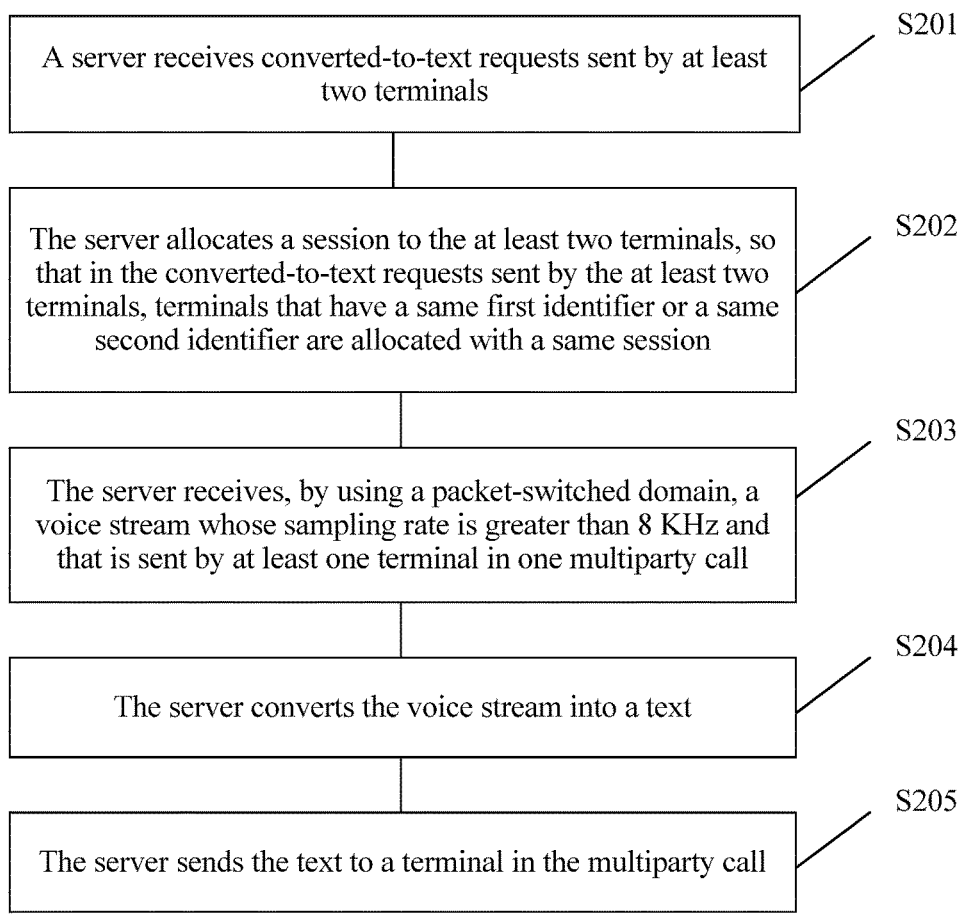
FIG. 2 is a schematic flowchart of a method for converting a voice into a text in a multiparty call according to an embodiment of the present invention.

Embodiment 1 of the present invention provides a method for converting a voice into a text in a multiparty call. As shown in FIG. 2, the method may include the following steps.

S201. A server receives converted-to-text requests sent by at least two terminals.

The converted-to-text requests include a first identifier and a second identifier.

Optionally, the server may be a server provided by an operator or a server provided by a third party.

The converted-to-text requests may be automatically sent by a terminal to the server during a multiparty call when a microphone (MIC for short) disposed on the terminal is enabled.

Optionally, the MIC disposed on the terminal may be enabled in the following two manners:

Manner 1. When making a call or answering a call, a user manually enables the MIC.

Manner 2. A user sets, in the terminal, that when the user makes a call or answers a call, the MIC is enabled by default.

It should be noted that in a process of a practical application, a manner of enabling the MIC on the terminal may be set according to an actual requirement, which is not limited in the present invention.

It should be noted that a converted-to-text request may be in a form of signaling, or may be in a form of a message. A form of the converted-to-text request is not limited in the present invention. When the converted-to-text request is in a form of signaling, it may be existing signaling, or may be newly set signaling. A type of signaling of the converted-to-text request is not limited either in the present invention.

It should further be noted that the converted-to-text request may further include other content, such as a user name and an email address that are of the terminal. The content may be preset in the terminal by the user. In a process of a practical application, different content may be added to the converted-to-text request according to an actual requirement. Specific content included in the converted-to-text request is not limited in the present invention.

Optionally, the first identifier and the second identifier may be a terminal identifier.

A terminal identifier may uniquely determine a terminal. Preferably, the terminal identifier is a telephone number of the terminal.

In a process of a multiparty call, terminals participating in the multiparty call include a calling terminal and a called terminal. The calling terminal is a terminal used by a user to actively make an outgoing call, and the called terminal is a terminal used by the user to passively answer a call.

Specifically, the first identifier may be an identifier of the calling terminal, and correspondingly, the second identifier may be an identifier of the called terminal; or the first identifier may be an identifier of the called terminal, and correspondingly, the second identifier may be an identifier of the calling terminal.

Exemplarily, it is assumed that a terminal 1 whose telephone number is 123 and a terminal 2 whose telephone number is 456 are in a process of a call (assuming that the terminal 1 is a calling terminal and the terminal 2 is a called terminal), when the terminal 1 enables a converted-to-text function, the server receives a converted-to-text request <123, 456> of the terminal 1; and when the terminal 2 enables the converted-to-text function, the server receives a converted-to-text request <123, 456> of the terminal 2.

S202. The server allocates a session to the at least two terminals, so that in the converted-to-text requests sent by the at least two terminals, terminals that have a same first identifier or a same second identifier are allocated with a same session.

A session is a process in which multiple parties (including two parties) perform telephone communication. When a multiparty call is completely established and each party participating in the multiparty call enables a function of converting a call into a text, a session is allocated to terminals used by all parties participating in the call.

Exemplarily, if a multiparty call involves ten participants and the ten participants all enable the function of converting a call into a text, a session is allocated to terminals used by the ten participants.

That the server allocates a session to the at least two terminals, so that in the converted-to-text requests sent by the at least two terminals, terminals that have a same first identifier or a same second identifier are allocated with a same session may include the following three cases:

Case 1. The server allocates a session to the at least two terminals, so that in the converted-to-text requests sent by the at least two terminals, terminals that have a same first identifier and a same second identifier are allocated with a same session.

Exemplarily, the server receives a converted-to-text request 1<123, 456> of a terminal A, and receives a converted-to-text request 2<123, 456> of a terminal B. Because a first identifier 123 included in the converted-to-text request of the terminal A is the same as a first identifier 123 included in the converted-to-text request of the terminal B, and a second identifier 456 included in the converted-to-text request of the terminal A is the same as a second identifier 456 included in the converted-to-text request of the terminal B, the server allocates a same session to the terminal A and the terminal B, so that in the converted-to-text requests sent by the at least two terminals, terminals that have a same first identifier and a same second identifier are allocated with a same session.

Case 2. The server allocates a session to the at least two terminals, so that in the converted-to-text requests sent by at least two terminals, terminals that have a same first identifier have a same session.

Exemplarily, the server receives a converted-to-text request 1<100, 001> that is sent by a terminal 1 to the server, and receives a converted-to-text request 2<100, 002> of a terminal 2. The converted-to-text request 1 and the converted-to-text request 2 have a same first identifier (100). Therefore, a same session is allocated to the terminal 1 and the terminal 2, so that in the converted-to-text requests sent by the at least two terminals, terminals that have a same first identifier have a same session.

Case 3. The server allocates a session to the at least two terminals, so that in the converted-to-text requests sent by the at least two terminals, terminals that have a same second identifier have a same session.

Exemplarily, the server receives a converted-to-text request 1<001, 100> that is sent by a terminal 1 to the server, and receives a converted-to-text request 2<002, 100> of a terminal 2. The converted-to-text request 1 and the converted-to-text request 2 have a same second identifier (100). Therefore, a same session is allocated to the terminal 1 and the terminal 2, so that in the converted-to-text requests sent by at least two terminals, terminals that have a same second identifier have a same session.

S203. The server receives, by using a packet-switched domain, a voice stream whose sampling rate is greater than 8 KHz and that is sent by at least one terminal in one multiparty call.

One multiparty call corresponds to one session.

The packet-switched domain refers to a link for transmitting a data service. A sampling rate of a voice transmitted by using the packet-switched domain may be greater than 8 KHz.

The sampling rate may also be referred to as a sampling frequency measured in Hertz (Hz for short), that is, a sampling quantity fetched from continuous signals per second.

Preferably, a sampling rate that is sent by a terminal participating in a session and that is received by the server by using the packet-switched domain is 16 Kilohertz (KHz for short).

It should be noted that before the server receives, by using a packet-switched domain, a voice stream whose sampling rate is greater than 8 KHz and that is sent by a terminal participating in a session, a data connection needs to be established between the terminal and the server. Optionally, a manner of establishing the data connection includes but is not limited to a Transmission Control Protocol (TCP for short) socket connection, a Hypertext Transfer Protocol (HTTP for short) connection, and the like. By using the foregoing data connection manners, a voice stream sent by a terminal to a server is transmitted in the packet-switched domain.

S204. The server converts the voice stream into a text.

Optionally, it may be that a speech recognition engine deployed on the server converts the voice stream into a call text.

Preferably, converting the voice stream into a call text may be performed in real time.

It should be noted that a text converted from the voice stream by the server is a text converted from a voice stream of each participant in a multiparty call, and content included in the text is sorted according to a speech sequence of each participant in the multiparty call.

Exemplarily, a multiparty call includes three participants, which are respectively a participant 1, a participant 2, and a participant 3. It is assumed that in the multiparty call, the participant 1 says: "Where do you think is relatively suitable for a discussion", then the participant 2 says: "I think the first meeting room is relatively suitable", and then the participant 3 says: "I think the corporate headquarters is relatively suitable." Then a text that is converted from a voice stream of the multiparty call by the server is as follows:

"Where do you think is relatively suitable for a discussion;

I think the first meeting room is relatively suitable; and

I think the corporate headquarters is relatively suitable."

S205. The server sends the text to a terminal in the multiparty call.

Exemplarily, it is assumed that participants in a multiparty call include a terminal 1, a terminal 2, and a terminal 3. The server receives voice streams of the terminal 1, the terminal 2, and the terminal 3, converts the received voice streams of the three terminals into a text, and sends the text to the terminal 1, the terminal 2, and the terminal 3.

Optionally, the server may distinguish different sessions by allocating a unique session identifier to each session, and when the server allocates a session to the at least two terminals, may send a session identifier allocated to the session to a terminal of the session.

Correspondingly, in the voice stream whose sampling rate is greater than 8 KHz and that is sent by at least one terminal in one multiparty call and is received by the server by using the packet-switched domain may also include a session identifier, so that the server distinguishes sessions.

According to the method for converting a voice into a text in a multiparty call provided in this embodiment of the present invention, a server receives converted-to-text requests sent by at least two terminals, where the converted-to-text requests include a first identifier and a second identifier; allocates a session to the at least two terminals, so that in the converted-to-text requests sent by the at least two terminals, terminals that have a same first identifier or a same second identifier are allocated with a same session; receives, by using a packet-switched domain, a voice stream whose sampling rate is greater than 8 KHz and that is sent by at least one terminal in one multiparty call, where the multiparty call corresponds to one session; converts the voice stream into a text; and sends the text to a terminal in the multiparty call. Because a voice stream received by the server is the voice stream whose sampling rate is greater than 8 KHz and that is received by using the packet-switched domain, the packet-switched domain may support transmission of a voice stream of a high sampling rate, and after the received voice stream is converted into a text, accuracy of an obtained text is high. Further, the process requires no manual operation, and is relatively quick and saves human labor and time. In conclusion, it may be learned that by using the method provided in the present invention, accurately obtaining a text converted from a voice in a multiparty call may be implemented in a time-saving and effortless way, which resolves a problem in a prior art that obtaining a text converted from a voice in a multiparty call is either time- and labor-consuming, or inaccurate.

Embodiment 2

Figure 3:
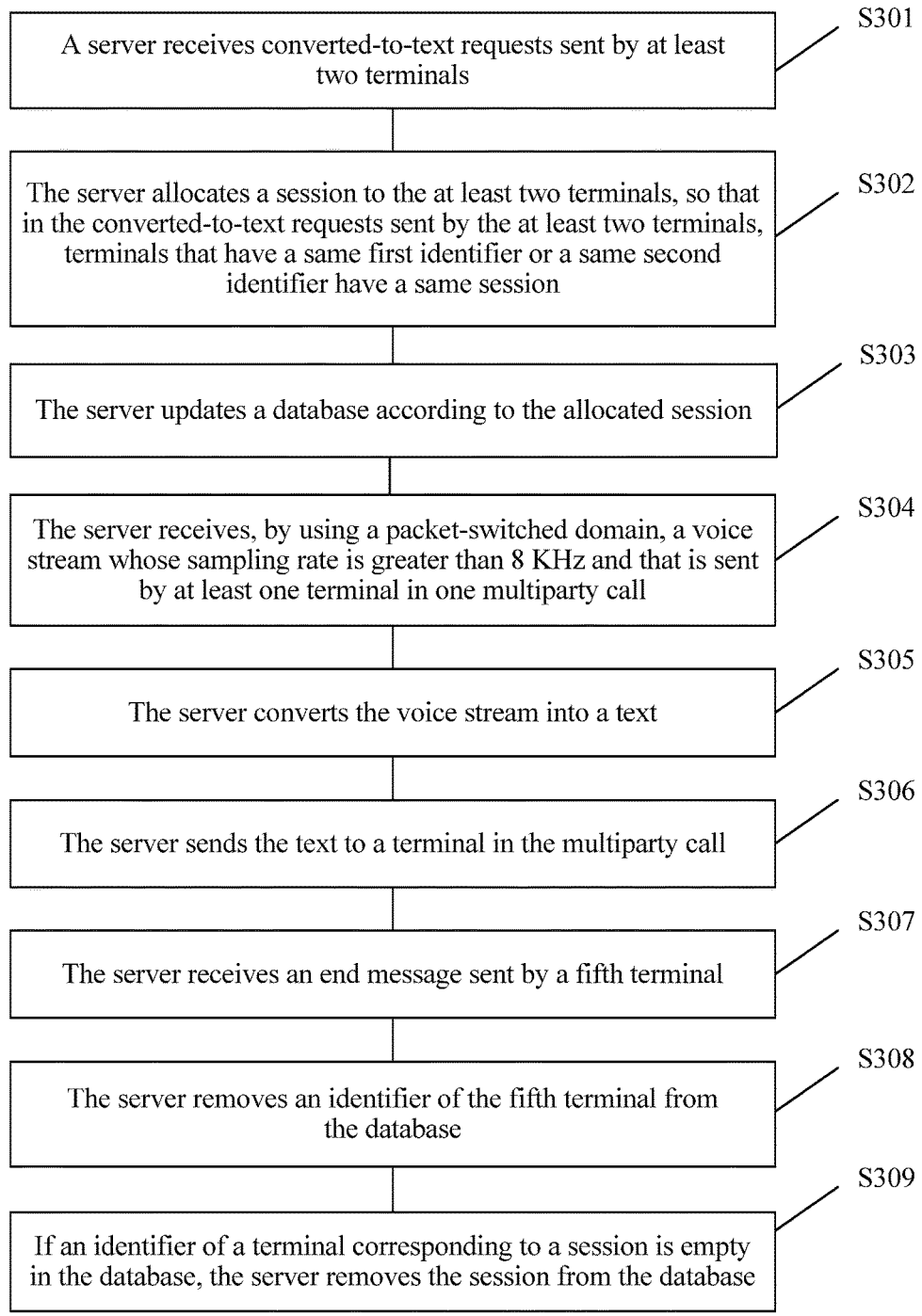
FIG. 3 is a schematic flowchart of another method for converting a voice into a text in a multiparty call according to an embodiment of the present invention.

Embodiment 2 of the present invention provides a method for converting a voice into a text in a multiparty call. As shown in FIG. 3, the method may include the following steps.

S301. A server receives converted-to-text requests sent by at least two terminals.

The converted-to-text requests include a first identifier and a second identifier.

It should be noted that S301 is the same as S201, and details are not described herein.

S302. The server allocates a session to the at least two terminals, so that in the converted-to-text requests sent by the at least two terminals, terminals that have a same first identifier or a same second identifier have a same session.

Specifically, that the server allocates a session to the at least two terminals includes the following two cases:

Case 1. When a database does not include a first identifier and a second identifier in a converted-to-text request sent by a second terminal, the first identifier in the converted-to-text request sent by the second terminal is the same as a first identifier in a converted-to-text request sent by a third terminal, and the second identifier in the converted-to-text request sent by the second terminal is the same as a second identifier in the converted-to-text request sent by the third terminal, a same new session is allocated to the second terminal and the third terminal.

The database includes at least one session and a terminal identifier corresponding to the at least one session.

Optionally, the database may be stored in a form of a table. Table 1 shows a type of database.

TABLE 1

| Session | Terminal identifier |
|---|---|
| Session 1 | Terminal 1 and terminal 2 |
| Session 2 | Terminal 3, terminal 4, and terminal 5 |
| Session 3 | Terminal 8, terminal 9, terminal 10, and terminal 11 |
| . . . | . . . |

It should be noted that Table 1 shows a form and content of the database merely in a form of a table, and sets no specific limitation on the form and the content of the database. Certainly, the database may also be stored in another form, and may include other content, which is not limited in the present invention.

Example 1: A terminal 1 whose telephone number is 111 and a terminal 2 whose telephone number is 222 establish a call, and both the terminal 1 and the terminal 2 enable a function of converting a call into a text. The server receives a converted-to-text request 1 <111, 222> of the terminal 1 and a converted-to-text request 2 <111, 222> of the terminal 2.

It is assumed that the database does not include a first identifier (111) and a second identifier (222) in the converted-to-text requests that are sent by the terminal 1 and the terminal 2. Because the first identifier (111) in the converted-to-text request 1 is the same as the first identifier (111) in the converted-to-text request 2, and the second identifier (222) in the converted-to-text request 1 is the same as the second identifier (222) in the converted-to-text request 2, a same new session 4 is allocated to the terminal 1 and the terminal 2.

Case 2. The database includes a first identifier or a second identifier in a converted-to-text request sent by a first terminal; and a session that is in the database and corresponding to the first identifier or the second identifier in the converted-to-text request sent by the first terminal is allocated to the first terminal.

The first terminal is any terminal of the at least two terminals.

Example 2: based on Example 1 in Case 1, during the call between the terminal 1 and the terminal 2, the terminal 1 makes a call to a terminal 3 whose telephone number is 333, so that the terminal 3 participates in the multiparty call between the terminal 1 and the terminal 2. It is assumed that both the terminal 1 and the terminal 3 enable a function of converting a call into a text. The server receives a converted-to-text request 3 <111, 333> of the terminal 1 and a converted-to-text request 4 <111, 333> of the terminal 3.

Because the database includes a first identifier (111) in the converted-to-text request 3 and the converted-to-text request 4, and a session corresponding to the first identifier (111) is a session 4, the session 4 that is in the database and corresponding to the first identifier (111) is allocated to the terminal 1 and the terminal 3.

It should be noted that in a multiparty call, it is assumed that the multiparty call is established in a way in which a common terminal makes a call to multiple participants, or the multiparty call is established in a way in which multiple participants make a call to a common terminal. After establishing a call with the multiple participants, the common terminal sends a converted-to-text request to the server by default. In addition, in the process of the multiparty call, the common terminal may send a converted-to-text request once to the server only when establishing a call with participants for the first time, and the server also needs to allocate a session only once to the common terminal.

Exemplarily, after a terminal 1 (whose identifier is iii) establishes a multiparty call with a common terminal (whose identifier is 100), the terminal 1 sends a converted-to-text request 1 <111, 000> to a server, the common terminal sends a converted-to-text request 2 <111, 000> to the server, and the server allocates a session 1 to the terminal 1 and the common terminal. In the multiparty call, a terminal 2 (whose identifier is 111) joins the multiparty call by making a call to the common terminal (whose identifier is 100). Then the terminal 2 sends a converted-to-text request 1 <222, 100> to the server, and the common terminal no longer sends a converted-to-text request to the server. In this case, the server allocates the session 1 to the terminal 2 only, and no longer allocates a session to the common terminal.

It should further be noted that a converted-to-text request may further include a meeting flag bit. The meeting flag bit is used to indicate that participants of this call are two parties or multiple parties (more than two parties). If a first identifier in a converted-to-text request sent by a second terminal is the same as a first identifier in a converted-to-text request sent by a third terminal, a second identifier in the converted-to-text request sent by the second terminal is the same as a second identifier in the converted-to-text request sent by the third terminal, and a meeting flag bit indicates that participants of this call are two parties, a server does not need to determine, when allocating a session to the second terminal and the third terminal, whether a database includes the first identifier or the second identifier in converted-to-text requests sent by the second terminal and the third terminal, and may directly allocate a new session to the second terminal and the third terminal.

Optionally, it may be that when making a call, a user manually selects content indicated by the meeting flag bit; or it may be that a user sets a telephone number to be a type in which participants are multiple parties (more than two parties), and when the user dials the telephone number, content of the meeting flag bit is selected by default to indicate that participants are multiple parties (more than two parties).

Exemplarily, it is assumed that a telephone number 100 is a common number of a meeting telephone, and a user sets the telephone number to be a type in which participants are multiple parties (more than two parties). When dialing the telephone number, the user does not need to manually select content indicated by a meeting flag bit, and a meeting flag bit included in a converted-to-text request automatically indicates that participants are multiple parties (more than two parties).

S303. The server updates a database according to the allocated session.

Specifically, a process in which the server updates the database according to the allocated session may include the following two cases:

Case 1. The allocated session is a new session, and the server establishes a correspondence between the allocated session and identifiers of the at least two terminals, and adds the correspondence to the database.

Case 2. The allocated session is a session in the database, and a terminal identifier that is not included in the database and that is in the identifiers of the at least two terminals is added to the database so that the added identifier is corresponding to the allocated session.

Exemplarily, it is assumed that a session allocated by the server to a terminal 12 and a terminal 13 is a new session 4. Then the server establishes a correspondence between the session 4 and identifiers of the terminal 12 and the terminal 13, and adds the correspondence to the database. If a form of an original database is shown in Table 1, after the correspondence is added to the database, the database is shown in Table 2.

TABLE 2

| Session | Terminal identifier |
|---|---|
| Session 1 | Terminal 1 and terminal 2 |
| Session 2 | Terminal 3, terminal 4, and terminal 5 |
| Session 3 | Terminal 8, terminal 9, terminal 10, and terminal 11 |
| Session 4 | Terminal 12 and terminal 13 |
| . . . | . . . |

Further, it is assumed that a session allocated by the server to the terminal 12 and a terminal 14 is the session 4 in the database. Because the database includes an identifier of the terminal 12 but does not include an identifier of the terminal 14, the server adds a terminal identifier (terminal 14) not included in the database to the database so that the added identifier is corresponding to the allocated session. The database to which the identifier of the terminal 14 is added is shown in Table 3.

TABLE 3

| Session | Terminal identifier |
|---|---|
| Session 1 | Terminal 1 and terminal 2 |
| Session 2 | Terminal 3, terminal 4, and terminal 5 |
| Session 3 | Terminal 8, terminal 9, terminal 10, and terminal 11 |
| Session 4 | Terminal 12, terminal 13, and terminal 14 |
| . . . | . . . |

S304. The server receives, by using a packet-switched domain, a voice stream whose sampling rate is greater than 8 KHz and that is sent by at least one terminal in one multiparty call.

The multiparty call corresponds to one session.

It should be noted that S304 is the same as S203, and details are not described herein.

It should further be noted that before the at least one terminal in the multiparty call sends a voice stream whose sampling rate is greater than 8 KHz to a server by using the packet-switched domain, a data connection further needs to be established between the terminal and the server.

Optionally, establishing the data connection between the terminal and the server is usually implemented in a way in which the terminal initiates a data connection request. The data connection request initiated by the terminal may be combined with the converted-to-text request in S301 to be one request. Further, the data connection is established between the terminal and the server. A manner of establishing the data connection includes but is not limited to a Transmission Control Protocol TCP socket connection, an HTTP connection, and the like. By using the foregoing data connection, a voice stream received by the server may be transmitted in a packet-switched domain.

Certainly, the data connection request and the converted-to-text request may also be two independent requests, which are not limited in the present invention.

It should further be noted that S303 and S304 may be executed sequentially, or may be executed concurrently, which is not limited in the present invention.

S305. The server converts the voice stream into a text.

Optionally, the text may include an identifier of the at least one terminal; or the text may include an identifier and a user name that are of the at least one terminal.

Exemplarily, a user A sets a terminal user name to be "Xiao Ming" in a terminal whose telephone number is 111 (an identifier of the terminal is in), and a user B sets a terminal user name to be "Xiao Hong" in a terminal whose telephone number is 222 (an identifier of the terminal is 222). In S301, the converted-to-text request sent by the terminal to the server includes a terminal user name. During a call between the user A and the user B, the user A says: "Where do we sign a contract", and the user B says: "We sign the contract in your company." Then during this call, a text converted from a voice stream by the server is as follows:

"Xiao Ming (111): Where do we sign a contract; and

Xiao Hong (222): We sign the contract in your company."

S306. The server sends the text to a terminal in the multiparty call.

Optionally, the server may send the text to the terminal in the multiparty call in real time, or may send the text according to a preset period, or may send the text after receiving an end message sent by the terminal in the multiparty call.

Specifically, a moment at which the server sends the text to the terminal in the multiparty call may include but is not limited to the following four cases:

Case 1. The server sends, according to a preset period, a text in the period to a terminal in the multiparty call.

It should be noted that in a process of a practical application, the preset period may be set according to an actual requirement, which is not limited in the present invention.

Exemplarily, it is assumed that terminals in a multiparty call are a terminal 1 and a terminal 2, and a preset period is one minute. Then since the terminal 1 and the terminal 2 begin a call, every one minute the server sends a text of the call between the two parties in the one minute to the terminal 1 and the terminal 2.

Case 2. After receiving end messages sent by all terminals in the multiparty call, the server sends a text to all the terminals in the multiparty call.

An end message is a message indicating that a call ends.

Optionally, the end message may be an on-hook request.

Exemplarily, it is assumed that terminals in a multiparty call are a terminal 3, a terminal 4, and a terminal 5. It is assumed that the three terminals begin a call at the same time, the terminal 3 first sends an end message to the server, and the terminal 4 and the terminal 5 then send end messages to the server. After the three terminals all send end messages to the server (after the terminal 4 and the terminal 5 send the end messages to the server), the server sends a text of this multiparty call to each terminal of the three terminals.

Case 3. After receiving end messages sent by all terminals in the multiparty call, the server sends a text of a process in which each terminal participates to each terminal in the multiparty call.

Exemplarily, it is assumed that terminals in a multiparty call are a terminal 6, a terminal 7, and a terminal 8. It is assumed that the three terminals begin a call at the same time. Then after a three-minute call, the terminal 6 sends an end message to the server, and after a five-minute call, the terminal 7 and the terminal 8 send end messages to the server.

After receiving end messages sent by the terminal 6, the terminal 7, and the terminal 8, the server sends, to the terminal 6, a text of the three-minute call that is among the terminal 6, the terminal 7, and the terminal 8 and in which the terminal 6 participates; sends, to the terminal 7, a text of the five-minute call that is among the terminal 6, the terminal 7, and the terminal 8 and in which the terminal 7 participates; and sends, to the terminal 8, a text of the five-minute call that is among the terminal 6, the terminal 7, and the terminal 8 and in which the terminal 8 participates.

Case 4. After receiving an end message sent by a first terminal in the multiparty call, the server sends, only to the first terminal, a text of a process in which the terminal participates.

Exemplarily, it is assumed that terminals in a multiparty call are a terminal 9, a terminal 10, and a terminal 11. It is assumed that the three terminals begin a call at the same time. Then after a three-minute call, the terminal 9 sends an end message to the server, and after a five-minute call, the terminal 10 and the terminal 11 send end messages to the server.

After receiving the end message sent by the terminal 9, the server sends, to the terminal 9, a text of the three-minute call that is among the terminal 9, the terminal 10, and the terminal 11 and in which the terminal 9 participates.

After receiving the end message sent by the terminal 10, the server sends, to the terminal 10, a text of the five-minute call that is among the terminal 9, the terminal 10, and the terminal 11 and in which the terminal 10 participates.

After receiving the end message sent by the terminal 11, the server sends, to the terminal 11, a text of the five-minute call that is among the terminal 9, the terminal 10, and the terminal 11 and in which the terminal 11 participates.

Further, in Case 4, after the text of the call in the process in which the terminal participates is sent to the first terminal, the method may further include: sending, to all terminals that are in a database and corresponding to a session that is corresponding to the first terminal, a text that is of a call of each terminal in a process in which the first terminal participates.

Exemplarily, it is assumed that terminals in a multiparty call are a terminal 12 and a terminal 13. When the server receives an end message sent by the terminal 12, the server sends, to the terminal 12 and the terminal 13, a text of a call between the terminal 12 and the terminal 13 in a process in which the terminal 12 participates.

It should be noted that the foregoing four cases describe a moment at which a server sends a text to a terminal in a multiparty call only in a form of an example, but set no limitation on a moment at which the server sends the text to the terminal in a multiparty call. In a process of a practical application, a moment at which a server sends a text to a terminal in a multiparty call may be set according to an actual requirement, which is not limited in the present invention.

S307. The server receives an end message sent by a fifth terminal.

S308. The server removes an identifier of the fifth terminal from the database.

Exemplarily, it is assumed that in the database, terminals corresponding to a session 1 are a terminal 1, a terminal 2, and a terminal 3. The server receives an end message (hanging up a call) sent by the terminal 1, and then the server removes an identifier of the terminal 1 from the database.

S309. If a terminal identifier corresponding to a session is empty in the database, the server removes the session from the database.

Exemplarily, it is assumed that a terminal identifier corresponding to a session 1 is empty in the database. Then the server removes the session 1 from the database.

According to the method for converting a voice into a text in a multiparty call provided in this embodiment of the present invention, a server receives converted-to-text requests sent by at least two terminals, where the converted-to-text requests include a first identifier and a second identifier; allocates a session to the at least two terminals, so that in the converted-to-text requests sent by the at least two terminals, terminals that have a same first identifier or a same second identifier are allocated with a same session; receives, by using a packet-switched domain, a voice stream whose sampling rate is greater than 8 KHz and that is sent by at least one terminal in one multiparty call, where the multiparty call corresponds to one session; converts the voice stream into a text; and sends the text to a terminal in the multiparty call. Because a voice stream received by the server is the voice stream whose sampling rate is greater than 8 KHz and that is received by using the packet-switched domain, the packet-switched domain may support transmission of a voice stream of a high sampling rate, and after the received voice stream is converted into a text, accuracy of an obtained text is high. Further, the process requires no manual operation, and is relatively quick and saves human labor and time. In conclusion, it may be learned that by using the method provided in the present invention, accurately obtaining a text converted from a voice in a multiparty call may be implemented in a time-saving and effortless way, which resolves a problem in a prior art that obtaining a text converted from a voice in a multiparty call is either time- and labor-consuming, or inaccurate.

Embodiment 3

Embodiment 3 of the present invention provides a method for converting a voice into a text in a multiparty call.

It is assumed that Zhang San uses a terminal A to make a call to Li Si who uses a terminal B; a telephone number of the terminal A is 123, and a telephone number of the terminal B is 456; and a user name of the terminal A that is set by Zhang San in the terminal A is Zhang San, and a user name of the terminal B that is set by Li Si in the terminal B is Li Si.

Figure 4A:
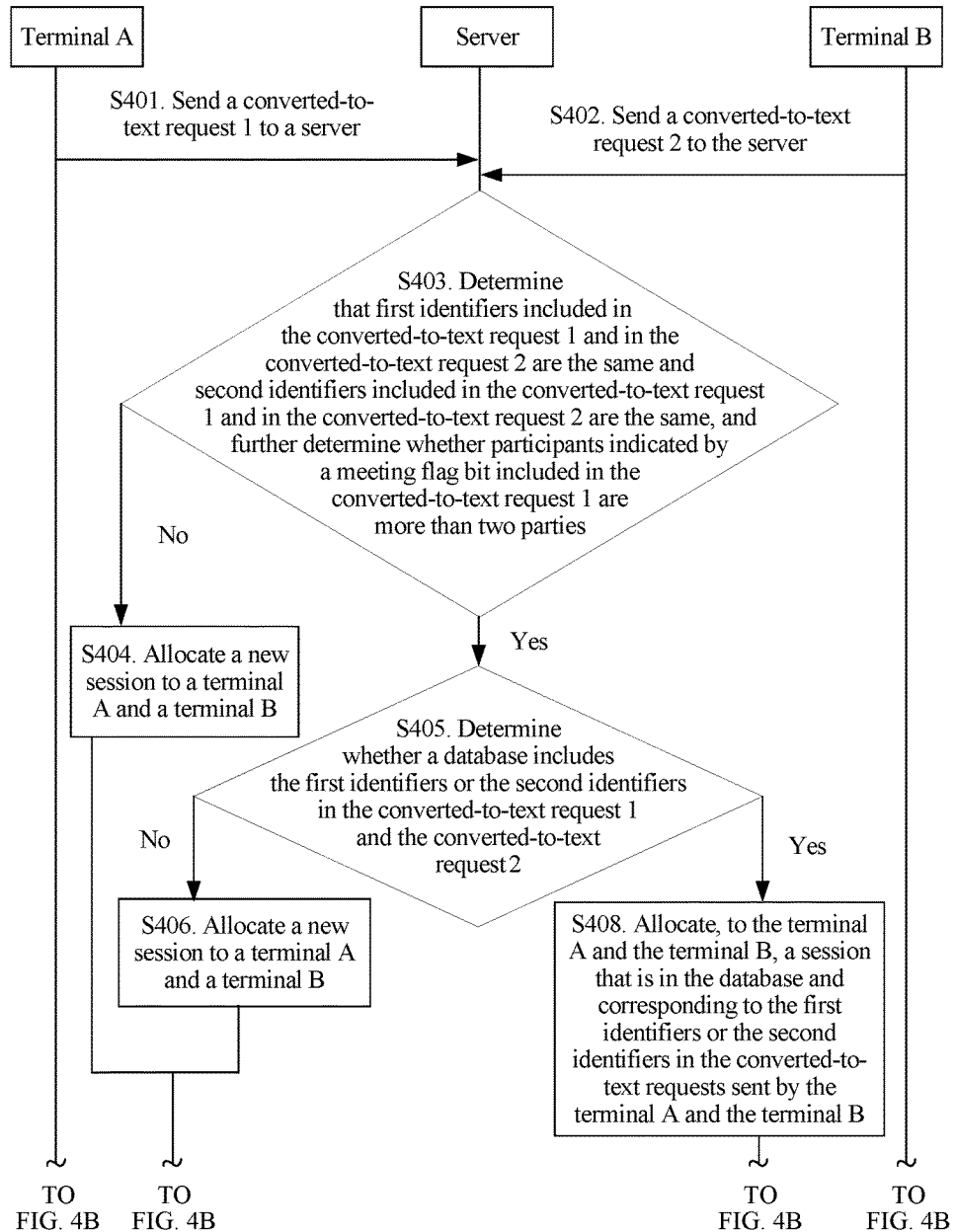
FIG. 4A and FIG. 4B are a schematic flowchart of still another method for converting a voice into a text in a multiparty call according to an embodiment of the present invention.
Figure 4B:
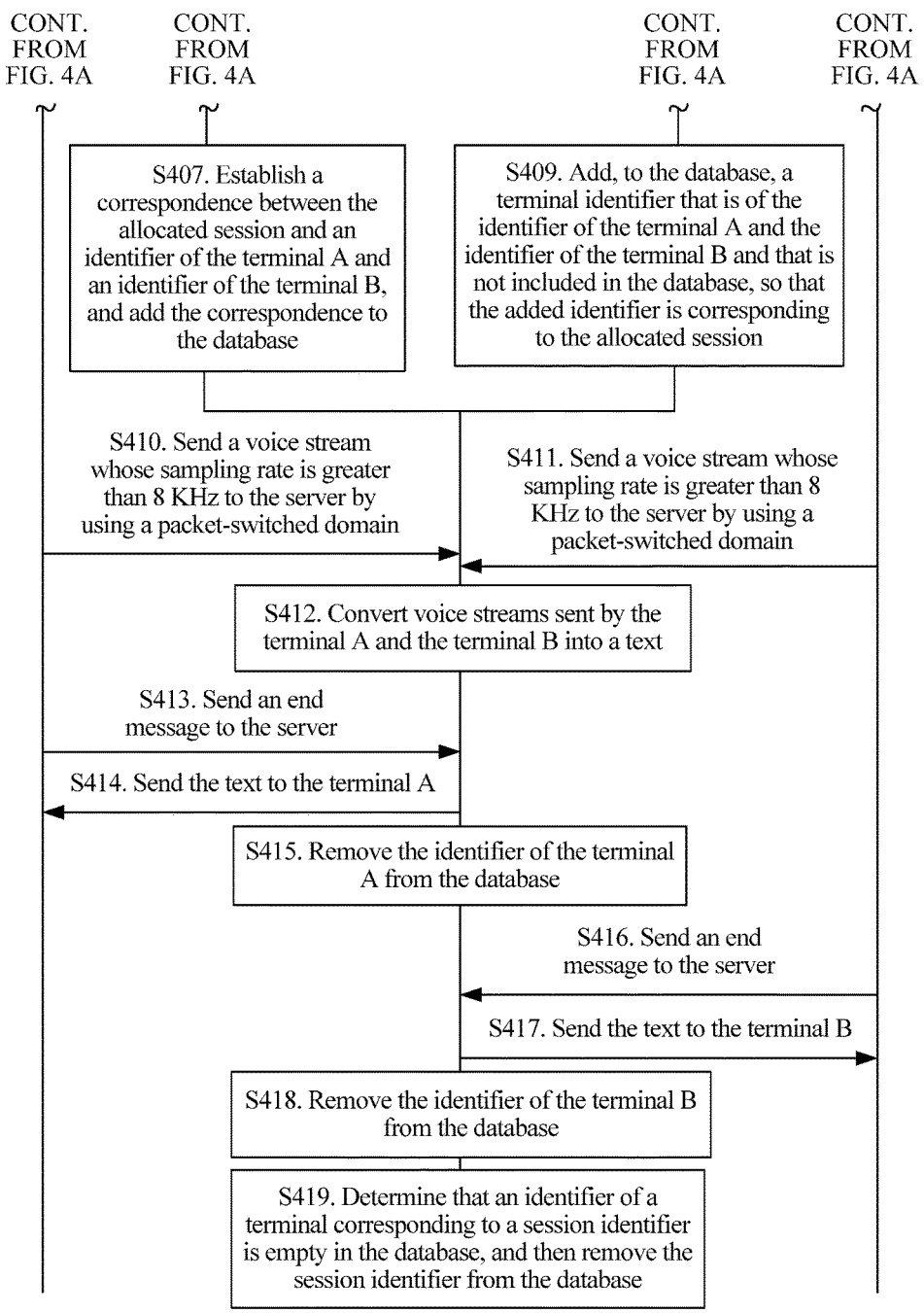

An interaction process among a server, the terminal A, and the terminal B is used as an example to describe the method in FIG. 3. As shown in FIG. 4A and FIG. 4B, the method may include the following steps.

S401. The terminal A sends a converted-to-text request 1 to the server.

Exemplarily, after the terminal A makes a call to the terminal B, Zhang San enables a MIC, and selects a meeting flag bit to indicate that this call is a call in which participants are more than two parties. Then the terminal A sends a converted-to-text request 1 <123, Zhang San, 456, TRUE> to the server, indicating that Zhang San (a terminal whose telephone number is 123) makes a call to a terminal whose telephone number is 456, where participants of the call are more than two parties.

S402. The terminal B sends a converted-to-text request 2 to the server.

Exemplarily, Li Si answers a call made by Zhang San, and enables a MIC. Then the terminal B sends a converted-to-text request 2 <123, 456, Li Si> to the server, indicating that the terminal whose telephone number is 123 makes a call to the terminal whose telephone number is 456.

S403. The server determines that first identifiers included in the converted-to-text request 1 and the converted-to-text request 2 are the same and second identifiers included in the converted-to-text request 1 and the converted-to-text request 2 are the same, and further determines whether participants indicated by a meeting flag bit included in the converted-to-text request 1 are more than two parties.

If the participants indicated by a meeting flag bit included in the converted-to-text request 1 are not more than two parties, S404 is performed.

If the participants indicated by a meeting flag bit included in the converted-to-text request 1 are more than two parties, S405 is performed.

S404. The server allocates a new session to the terminal A and the terminal B.

Exemplarily, the server allocates a new session 1 to the terminal A and the terminal B.

S405. The server determines whether a database includes the first identifier or the second identifier in the converted-to-text request 1 and the converted-to-text request 2.

If the database does not include the first identifier or the second identifier in the converted-to-text request 1 and the converted-to-text request 2, S406 is performed.

If the database includes the first identifier or the second identifier in the converted-to-text request 1 and the converted-to-text request 2, S408 is performed.

S406. The server allocates a new session to the terminal A and the terminal B.

It should be noted that after S404 and S406, S407 needs to be performed.

S407. The server establishes a correspondence between the allocated session and an identifier of the terminal A and an identifier of the terminal B, and adds the correspondence to the database.

Exemplarily, it is assumed that in S404 or S406, the session allocated to the terminal A and the terminal B is a session 1. Then a correspondence between the session 1 and an identifier (123) of the terminal A and an identifier (456) of the terminal B is established, and the correspondence is added to the database.

S408. The server allocates, to the terminal A and the terminal B, a session that is in the database and corresponding to a first identifier or a second identifier in converted-to-text requests sent by the terminal A and the terminal B.

Exemplarily, the server determines that the database includes a second identifier 456 (the identifier of the terminal B) in the converted-to-text request 1 and the converted-to-text request 2, and in the database, a session corresponding to the second identifier 456 is a session 2. Then the session 2 is allocated to the terminal A and the terminal B.

S409. The server adds, to the database, a terminal identifier that is of the identifier of the terminal A and the identifier of the terminal B but is not included in the database, so that the added identifier is corresponding to the allocated session.

Exemplarily, the server determines that the database includes the second identifier 456 (the identifier of the terminal B) in the converted-to-text request 1 and the converted-to-text request 2 but does not include a first identifier 123 (the identifier of the terminal A), and in the database, a session corresponding to the second identifier 456 is the session 2. Then the server adds the identifier of the terminal A to the database so that the added identifier is corresponding to the session 2.

S410. The terminal A sends a voice stream whose sampling rate is greater than 8 KHz to the server by using a packet-switched domain.

Exemplarily, the terminal A sends a voice stream whose sampling rate is greater than 8 KHz to the server by using the packet-switched domain: "Where do we hold our meeting."

S411. The terminal B sends a voice stream whose sampling rate is greater than 8 KHz to the server by using the packet-switched domain.

Exemplarily, the terminal B sends a voice stream whose sampling rate is greater than 8 KHz to the server by using the packet-switched domain: "In the first meeting room in the corporate headquarters."

S412. The server converts the voice streams sent by the terminal A and the terminal B into a text.

Exemplarily, based on the examples in S410 and S411, the server converts the voice stream sent by the terminal A into a text, which is as follows:

Zhang San (123): Where do we hold our meeting; and
Li Si (456): In the first meeting room in the corporate headquarters.

S413. The terminal A sends an end message to the server.

Exemplarily, after hanging up a call, the terminal A sends an end message "OVER" to the server.

S414. The server sends the text to the terminal A.

Exemplarily, based on the example in S412, the server sends the text to the terminal A, which is as follows:

Zhang San (123): Where do we hold our meeting; and
Li Si (456): In the first meeting room in the corporate headquarters.

S415. The server removes the identifier of the terminal A from the database.

S416. The terminal B sends an end message to the server.

Exemplarily, after hanging up a call, the terminal B sends an end message "OVER" to the server.

S417. The server sends the text to the terminal B.

Exemplarily, based on the example in S412, the server sends the text to the terminal B, which is as follows:

Zhang San (123): Where do we hold our meeting; and
Li Si (456): In the first meeting room in the corporate headquarters.

S418. The server removes the identifier of the terminal B from the database.

S419. The server determines that an identifier of a terminal corresponding to a session is empty in the database, and then removes the session from the database.

Exemplarily, the server determines that an identifier of a terminal corresponding to a session 3 is empty, and then the server removes the session 3 from the database.

According to the method for converting a voice into a text in a multiparty call provided in this embodiment of the present invention, a server receives converted-to-text requests sent by at least two terminals, where the converted-to-text requests include a first identifier and a second identifier; allocates a session to the at least two terminals, so that in the converted-to-text requests sent by the at least two terminals, terminals that have a same first identifier or a same second identifier are allocated with a same session; receives, by using a packet-switched domain, a voice stream whose sampling rate is greater than 8 KHz and that is sent by at least one terminal in one multiparty call, where the multiparty call corresponds to one session; converts the voice stream into a text; and sends the text to a terminal in the multiparty call. Because a voice stream received by the server is the voice stream whose sampling rate is greater than 8 KHz and that is received by using the packet-switched domain, the packet-switched domain may support transmission of a voice stream of a high sampling rate, and after the received voice stream is converted into a text, accuracy of an obtained text is high. Further, the process requires no manual operation, and is relatively quick and saves human labor and time. In conclusion, it may be learned that by using the method provided in the present invention, accurately obtaining a text converted from a voice in a multiparty call may be implemented in a time-saving and effortless way, which resolves a problem in a prior art that obtaining a text converted from a voice in a multiparty call is either time- and labor-consuming, or inaccurate.

Embodiment 4

Figure 5:
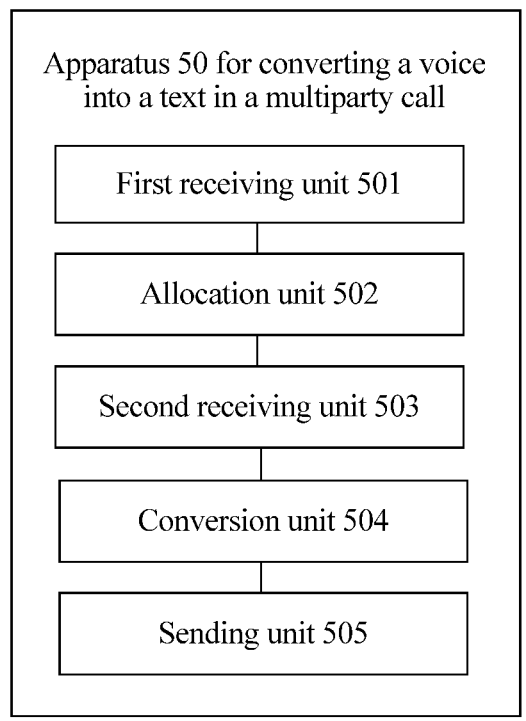
FIG. 5 is a schematic structural diagram of an apparatus for converting a voice into a text in a multiparty call according to an embodiment of the present invention.

Embodiment 4 of the present invention provides an apparatus 50 for converting a voice into a text in a multiparty call. The apparatus 50 is a part or all of the server in the foregoing embodiments. As shown in FIG. 5, the apparatus 50 for converting a voice into a text in the multiparty call may include: a first receiving unit 501, configured to receive converted-to-text requests sent by at least two terminals, where the converted-to-text requests include a first identifier and a second identifier; an allocation unit 502, configured to allocate a session to the at least two terminals, so that in the converted-to-text requests sent by the at least two terminals, terminals that have a same first identifier or a same second identifier have a same session; a second receiving unit 503, configured to receive, by using a packet-switched domain, a voice stream whose sampling rate is greater than 8 KHz and that is sent by at least one terminal in one multiparty call, where the multiparty call corresponds to one session; a conversion unit 504, configured to convert the voice stream into a text; and a sending unit 505, configured to send the text to a terminal in the multiparty call.

Further, the allocation unit 502 may be specifically configured to: if a database includes a first identifier or a second identifier in a converted-to-text request sent by a first terminal, allocate, to the first terminal, a session that is in the database and corresponding to the first identifier or the second identifier in the converted-to-text request sent by the first terminal, where the first terminal is any terminal of the at least two terminals, and the database includes at least one session and a terminal identifier corresponding to the at least one session; and if the database does not include a first identifier and a second identifier in a converted-to-text request sent by a second terminal, the first identifier in the converted-to-text request sent by the second terminal is the same as a first identifier in a converted-to-text request sent by a third terminal, and the second identifier in the converted-to-text request sent by the second terminal is the same as a second identifier in the converted-to-text request sent by the third terminal, allocate a same new session to the second terminal and the third terminal.

Optionally, a text may include an identifier of at least one terminal, or a text may include an identifier and a user name that are of the at least one terminal.

Figure 6:
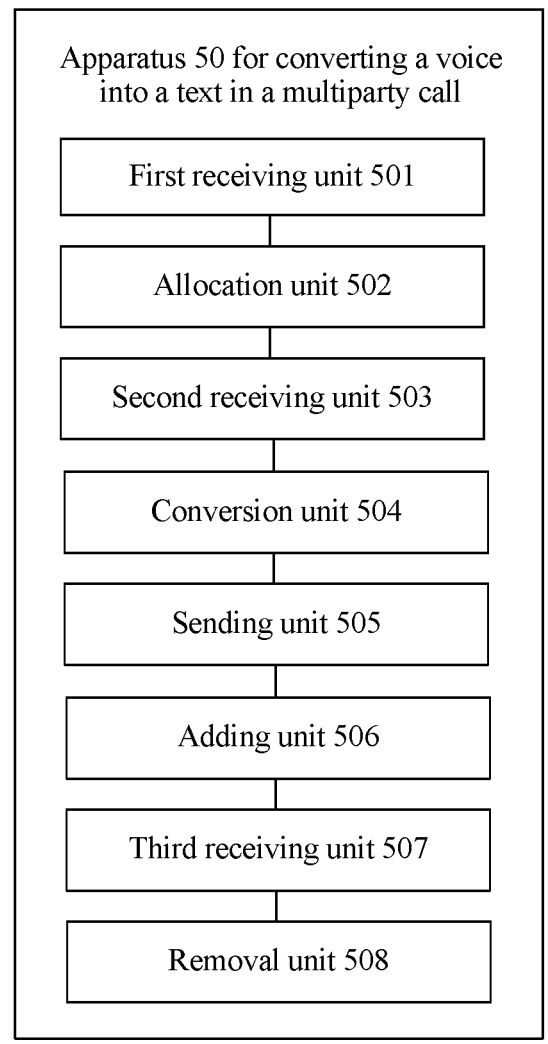
FIG. 6 is a schematic structural diagram of another apparatus for converting a voice into a text in a multiparty call according to an embodiment of the present invention.

Further, as shown in FIG. 6, the apparatus 50 for converting a voice into a text in a multiparty call may further include: an adding unit 506, configured to: if the allocated session is a new session, establish a correspondence between the allocated session and identifiers of the at least two terminals, and add the correspondence to the database; where the adding unit 506 may further be configured to: if the allocated session is a session in the database, add, to the database, a terminal identifier that is of the identifiers of the at least two terminals and is not included in the database, so that the added identifier is corresponding to the allocated session.

Further, as shown in FIG. 6, the apparatus 50 for converting a voice into a text in a multiparty call may further include: a third receiving unit 507, configured to receive an end message sent by a fifth terminal; and a removal unit 508, configured to remove an identifier of the fifth terminal from the database, where the removal unit 508 may further be configured to: if an identifier of a terminal corresponding to a session is empty in the database, remove the session from the database.

According to the apparatus 50 for converting a voice into a text in a multiparty call provided in this embodiment of the present invention, converted-to-text requests sent by at least two terminals are received, where the converted-to-text requests include a first identifier and a second identifier; a session is allocated to the at least two terminals, so that in the converted-to-text requests sent by the at least two terminals, terminals that have a same first identifier or a same second identifier are allocated with a same session; a voice stream whose sampling rate is greater than 8 KHz and that is sent by at least one terminal in one multiparty call is received by using a packet-switched domain, where the multiparty call corresponds to one session; the voice stream is converted into a text; and the text is sent to a terminal in the multiparty call. Because a received voice stream is the voice stream whose sampling rate is greater than 8 KHz and that is received by using a packet-switched domain, the packet-switched domain may support transmission of a voice stream of a high sampling rate, and after the received voice stream is converted into a text, accuracy of an obtained text is high. Further, the process requires no manual operation, and is relatively quick and saves human labor and time. In conclusion, it may be learned that by using the method provided in the present invention, accurately obtaining a text converted from a voice in a multiparty call may be implemented in a time-saving and effortless way, which resolves a problem in a prior art that obtaining a text converted from a voice in a multiparty call is either time- and labor-consuming, or inaccurate.

Embodiment 5

Figure 7:
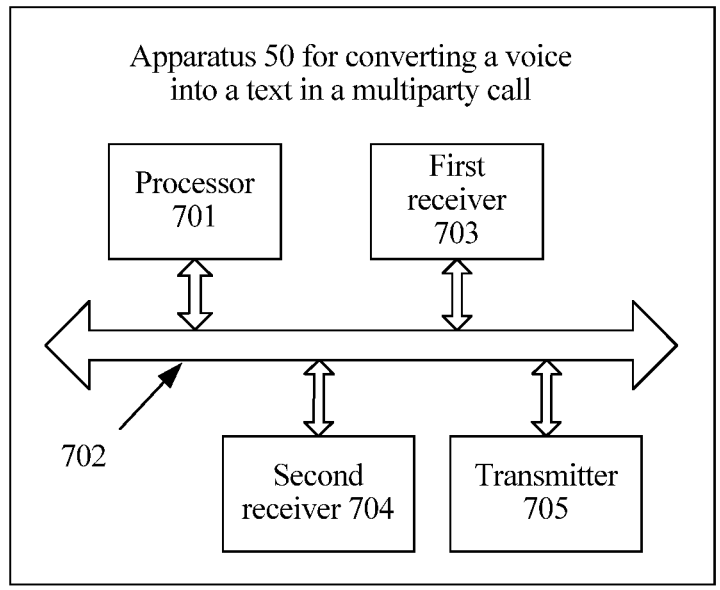
FIG. 7 is a schematic structural diagram of still another apparatus for converting a voice into a text in a multiparty call according to an embodiment of the present invention.

Embodiment 5 of the present invention provides an apparatus 50 for converting a voice into a text in a multiparty call. The apparatus 50 is a part or all of the server in the foregoing embodiments. As shown in FIG. 7, the apparatus 50 for converting a voice into a text in a multiparty call may include: at least one processor 701; at least one communications bus 702, configured to implement connection and mutual communication between apparatus; a first receiver 703, a second receiver 704, and a transmitter 705.

The communications bus 702 may be an industry standard architecture (ISA for short) bus, a peripheral component interconnect (PCI for short) bus, an Extended Industry Standard Architecture (EISA for short) bus, or the like. The bus may be classified into an address bus, a data bus, a control bus, and the like. For convenience of indication, the bus is merely represented by using one thick line in FIG. 7; however, it does not indicate that there is only one bus or only one type of buses.

The processor 701 may be a central processing unit (CPU for short), or an application-specific integrated circuit (ASIC for short), or one or more integrated circuits configured to implement this embodiment of the present invention.

The first receiver 703 is configured to receive converted-to-text requests sent by at least two terminals, where the converted-to-text requests include a first identifier and a second identifier.

The processor 701 is configured to allocate a session to the at least two terminals, so that in the converted-to-text requests sent by the at least two terminals, terminals that have a same first identifier or a same second identifier have a same session.

The second receiver 704 is configured to receive, by using a packet-switched domain, a voice stream whose sampling rate is greater than 8 KHz and that is sent by at least one terminal in one multiparty call, where the multiparty call corresponds to one session.

The processor 701 may further be configured to convert the voice stream into a text.

The transmitter 705 is configured to send the text to a terminal in the multiparty call.

Further, the processor 701 may further be specifically configured to:if a database includes a first identifier or a second identifier in a converted-to-text request sent by a first terminal, allocate, to the first terminal, a session that is in the database and corresponding to the first identifier or the second identifier in the converted-to-text request sent by the first terminal, where the first terminal is any terminal of the at least two terminals, and the database includes at least one session and a terminal identifier corresponding to the at least one session; and if the database does not include a first identifier and a second identifier in a converted-to-text request sent by a second terminal, the first identifier in the converted-to-text request sent by the second terminal is the same as a first identifier in a converted-to-text request sent by a third terminal, and the second identifier in the converted-to-text request sent by the second terminal is the same as a second identifier in the converted-to-text request sent by the third terminal, allocate a same new session to the second terminal and the third terminal.

Optionally, a text may include an identifier of at least one terminal, or a text may include an identifier and a user name that are of the at least one terminal.

Further, the processor 701 may further be configured to: if the allocated session is a new session, establish a correspondence between the allocated session and identifiers of the at least two terminals, and add the correspondence to the database; or if the allocated session is a session in the database, add, to the database, a terminal identifier that is of the identifiers of the at least two terminals and that is not included in the database, so that the added identifier is corresponding to the allocated session.

Figure 8:
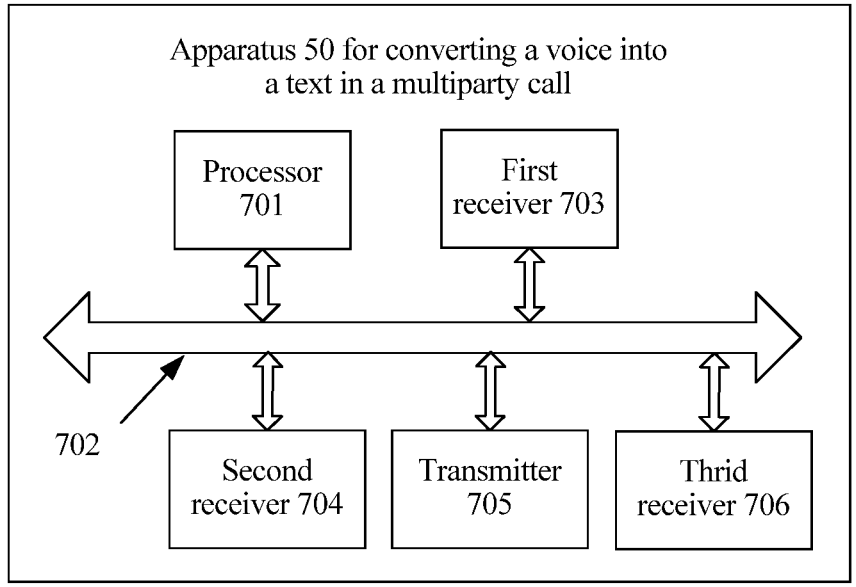
FIG. 8 is a schematic structural diagram of yet another apparatus for converting a voice into a text in a multiparty call according to an embodiment of the present invention.

Further, as shown in FIG. 8, the apparatus 50 for converting a voice into a text in a multiparty call may further include: a third receiver 706, configured to receive an end message sent by a fifth terminal.

Further, the processor 701 may further be configured to remove an identifier of the fifth terminal from the database.

The processor 701 may further be configured to: if an identifier of a terminal corresponding to a session is empty in the database, remove the session from the database.

According to the apparatus 50 for converting a voice into a text in a multiparty call provided in this embodiment of the present invention, converted-to-text requests sent by at least two terminals are received, where the converted-to-text requests include a first identifier and a second identifier; a session is allocated to the at least two terminals, so that in the converted-to-text requests sent by the at least two terminals, terminals that have a same first identifier or a same second identifier are allocated with a same session; a voice stream whose sampling rate is greater than 8 KHz and that is sent by at least one terminal in one multiparty call is received by using a packet-switched domain, where the multiparty call corresponds to one session; the voice stream is converted into a text; and the text is sent to a terminal in the multiparty call. Because a received voice stream is the voice stream whose sampling rate is greater than 8 KHz and that is received by using a packet-switched domain, the packet-switched domain may support transmission of a voice stream of a high sampling rate, and after the received voice stream is converted into a text, accuracy of an obtained text is high. Further, the process requires no manual operation, and is relatively quick and saves human labor and time. In conclusion, it may be learned that by using the method provided in the present invention, accurately obtaining a text converted from a voice in a multiparty call may be implemented in a time-saving and effortless way, which resolves a problem in a prior art that obtaining a text converted from a voice in a multiparty call is either time- and labor-consuming, or inaccurate.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present invention. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present invention but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for converting speech to text in a multiparty call, applied to a server, wherein the method comprises:
   receiving speech-to-text requests that are sent by at least two terminals, wherein the speech-to-text requests comprise a first identifier, a second identifier, and a meeting flag indicating whether the multiparty call comprises more than two terminals, wherein the meeting flag is set to a first value indicating that the multiparty call comprises two terminals or the meeting flag is set to a second value indicating that the multiparty call comprises more than two terminals, and wherein the speech-to-text requests that are sent by the at least two terminals further comprise:
   a first speech-to-text request sent by a first terminal;
   a second speech-to-text request sent by a second terminal; and
   a third speech-to-text request sent by a third terminal;
   allocating, according to the meeting flag, a session to the at least two terminals, so that in the speech-to-text requests sent by the at least two terminals, terminals that have a same first identifier or a same second identifier have a same session, wherein allocating the session to the at least two terminals comprises:
   when a database comprises the first identifier of the first speech-to-text request or the second identifier of the first speech-to-text request, allocating, to the first terminal, the session, wherein the session is a pre-existing session that is in the database and that corresponds to the first identifier of the first speech-to-text request or to the second identifier of the first speech-to-text request, wherein the first terminal is any terminal of the at least two terminals, and the database comprises at least one session and a terminal identifier corresponding to the at least one session; and
   when the database does not comprise the first identifier of the second speech-to-text request and the second identifier of the second speech-to-text request, the first identifier of the second speech-to-text request is equivalent to the first identifier of the third speech-to-text request, and the second identifier of the second speech-to-text request is equivalent to the second identifier of the third speech-to-text request, allocating, to the second terminal and to the third terminal, the session, wherein the session is a new session;
   receiving, using a packet-switched domain, a voice stream whose sampling rate is greater than 8 KHz and that is sent by at least one terminal in the multiparty call, wherein the multiparty call corresponds to one session;
   converting the voice stream into a text; and
   sending the text to one or more terminals in the multiparty call.

2. The method according to claim 1, wherein after allocating the session to the at least two terminals, the method further comprises:

when the session is the new session, establishing a correspondence between the session and identifiers of the at least two terminals, and adding the correspondence to the database.

3. The method according to claim 1, wherein after allocating the session to the at least two terminals, the method further comprises:
when the session is the pre-existing session in the database, adding, to the database, an identifier that is in the identifiers of the at least two terminals and that is of a terminal not comprised in the database, so that the added identifier corresponds to the session.

4. The method according to claim 1, wherein after receiving the voice stream, the method further comprises:
receiving an end message sent by the first terminal;
removing an identifier of the first terminal from the database; and
when an identifier of a terminal corresponding to a session is empty in the database, removing the session from the database.

5. The method according to claim 1, wherein the text comprises an identifier of the at least one terminal.

6. The method according to claim 1, wherein the text comprises an identifier and a user name that are of the at least one terminal.

7. The method according to claim 1, wherein:
the speech-to-text requests that are sent by the at least two terminals comprise:
a fourth speech-to-text request sent by a fourth terminal; and
a fifth speech-to-text request sent by a fifth terminal;
the meeting flag of the fourth speech-to-text request is set to the first value indicating that the multiparty call comprises two terminals; and
allocating the session to the at least two terminals comprises allocating, to the fourth terminal and to the fifth terminal, another new session.

8. The method according to claim 1, wherein:
the speech-to-text requests that are sent by the at least two terminals comprise:
a fourth speech-to-text request sent by a fourth terminal; and
a fifth speech-to-text request sent by a fifth terminal;
the meeting flag of the fourth speech-to-text request is set to the second value indicating that the multiparty call comprises more than two terminals; and
allocating the session to the at least two terminals comprises:
determining, based on the meeting flag of the fourth speech-to-text request indicating that the multiparty call comprises more than two terminals, whether the database comprises the first identifier of the fourth speech-to-text request or the second identifier of the fourth speech-to-text request or the second identifier of the fifth speech-to-text request or the second identifier of the fifth speech-to-text request; and
allocating, based on the determination, to the fourth terminal and to the fifth terminal, another new session.

9. The method according to claim 1, wherein receiving the speech-to-text requests that are sent by the at least two terminals comprises receiving the speech-to-text requests in response to the at least two terminals determining that a corresponding microphone of each terminal of the at least two terminals is activated during the multiparty call.

10. An apparatus for converting speech to text in a multiparty call, wherein the apparatus comprises:
a first receiver configured to receive speech-to-text requests that are sent by at least two terminals, wherein the speech-to-text requests comprise a first identifier, a second identifier, and a meeting flag indicating whether the multiparty call comprises more than two terminals, wherein the meeting flag is set to a first value indicating that the multiparty call comprises two terminals or the meeting flag is set to a second value indicating that the multiparty call comprises more than two terminals, and wherein the speech-to-text requests that are sent by the at least two terminals further comprise:
a first speech-to-text request sent by a first terminal;
a second speech-to-text request sent by a second terminal; and
a third speech-to-text request sent by a third terminal;
a non-transitory computer-readable memory storage comprising instructions;
a processor in communication with the non-transitory computer-readable memory storage, wherein the processor executes the instructions to allocate, according to the meeting flag, a session to the at least two terminals, so that in the speech-to-text requests sent by the at least two terminals, terminals that have a same first identifier or a same second identifier have a same session, wherein the instructions to allocate the session to the at least two terminals comprise instructions to:
when a database comprises the first identifier of the first speech-to-text request or the second identifier of the first speech-to-text request, allocate, to the first terminal, the session, wherein the session is a pre-existing session that is in the database and that corresponds to the first identifier of the first speech-to-text request or to the second identifier of the first speech-to-text request, wherein the first terminal is any terminal of the at least two terminals, and the database comprises at least one session and a terminal identifier corresponding to the at least one session; and
when the database does not comprise the first identifier of the second speech-to-text request and the second identifier of the second speech-to-text request, the first identifier of the second speech-to-text request is equivalent to the first identifier of the third speech-to-text request, and the second identifier of the second speech-to-text request is equivalent to the second identifier of the third speech-to-text request, allocate, to the second terminal and to the third terminal, the session, wherein the session is a new session;
a second receiver configured to receive, using a packet-switched domain, a voice stream whose sampling rate is greater than 8 KHz and that is sent by at least one terminal in the multiparty call, wherein the multiparty call corresponds to one session;
the processor executes further instructions to convert the voice stream into a text; and
a transmitter configured to send the text to one or more terminals in the multiparty call.

11. The apparatus according to claim 10, wherein the processor executes further instructions to:
when the session is the new session, establish a correspondence between the session and identifiers of the at least two terminals, and add the correspondence to the database.

12. The apparatus according to claim 10, wherein the processor executes further instructions to:

when the session is the pre-existing session in the database, add, to the database, an identifier that is in the identifiers of the at least two terminals and that is of a terminal not comprised in the database, so that the added identifier corresponds to the session.

13. The apparatus according to claim 10, wherein:
the apparatus further comprises a third receiver configured to receive an end message sent by the first terminal;
the processor executes further instructions to:
   remove an identifier of the first terminal from the database; and
   when an identifier of a terminal corresponding to a session is empty in the database, remove the session from the database.

14. The apparatus according to claim 10, wherein the text comprises an identifier of the at least one terminal.

15. The apparatus according to claim 10, wherein the text comprises an identifier and a user name that are of the at least one terminal.

16. The apparatus according to claim 10, wherein:
the speech-to-text requests that are sent by the at least two terminals comprise:
   a fourth speech-to-text request sent by a fourth terminal; and
   a fifth speech-to-text request sent by a fifth terminal;
the meeting flag of the fourth speech-to-text request is set to the first value indicating that the multiparty call comprises two terminals; and
instructions to allocate the session to the at least two terminals comprise further instructions to allocate, to the fourth terminal and to the fifth terminal, another new session.

17. The apparatus according to claim 10, wherein:
the speech-to-text requests that are sent by the at least two terminals comprise:
   a fourth speech-to-text request sent by a fourth terminal; and
   a fifth speech-to-text request sent by a fifth terminal;
the meeting flag of the fourth speech-to-text request is set to the second value indicating that the multiparty call comprises more than two terminals; and
instructions to allocate the session to the at least two terminals comprise further instructions to:
   determine, based on the meeting flag of the fourth speech-to-text request indicating that the multiparty call comprises more than two terminals, whether the database comprises the first identifier of the fourth speech-to-text request or the second identifier of the fourth speech-to-text request or the first identifier of the fifth speech-to-text request or the second identifier of the fifth speech-to-text request; and
   allocate, based on the determination, to the fourth terminal and to the fifth terminal, another new session.

18. The apparatus according to claim 10, wherein the first receiver is further configured to receive the speech-to-text requests in response to a determination that a microphone of a terminal in the multiparty call is activated.

\* \* \* \* \*